United States Patent

[11] 3,583,422

| [72] | Inventors | Hansjörg Dach<br>Friedrichshafen;<br>Konrad Sterk, Ravensburg; Winfried<br>Felder, Aulendorf, all of, Germany |
|---|---|---|
| [21] | Appl. No. | 766,679 |
| [22] | Filed | Oct. 11, 1968 |
| [45] | Patented | June 8, 1971 |
| [73] | Assignee | Zahnradfabrik Friedrichshafen<br>Aktiengesellschaft<br>Friedrichshafen, Germany |
| [32] | Priority | Oct. 19, 1967, Dec. 1, 1967 |
| [33] | | Germany |
| [31] | | P 16 50 612.0 and P 16 50 928.7 |

[54] VALVE CONSTRUCTION FOR CONTROLLED PRESSURE BUILDUP IN FLUID-OPERATED BRAKE OR CLUTCH
12 Claims, 14 Drawing Figs.

[52] U.S. Cl. ............................................. 137/116.3,
 137/505.14, 137/505.15, 91/433, 91/447
[51] Int. Cl. ................................................. F16k 31/12
[50] Field of Search............................................ 91/433,
 447; 137/116.3, 505.14, 505.15

[56] References Cited
UNITED STATES PATENTS
| 2,741,263 | 4/1956 | Spencer....................... | 137/505.14 |
| 3,098,507 | 7/1963 | Froslie........................... | 137/505.14X |
| 3,121,342 | 2/1964 | Breting et al. ................ | 91/447X |
| 3,171,433 | 3/1965 | Borman, Jr. et al........... | 137/116.3X |
| 3,225,619 | 12/1965 | Schaefer....................... | 137/116.3X |

*Primary Examiner*—Robert G. Nilson
*Attorney*—Karl F. Ross

ABSTRACT: A hydraulic valve with an inlet port for high-pressure fluid, an outlet port leading to a load such as a hydraulically operated clutch or brake, and a discharge port communicating with a low-pressure region or sump has a slider which, in response to the pressure of incoming fluid at the inlet port, initially establishes a connection between the inlet and outlet ports and, in response to fluid pressure building up in that connection, shifts into a regulating position in which the inlet port is partly cut off and/or the discharge port partly communicates with the outlet port to establish a balance between the inlet pressure and a counteracting pressure from a spring and/or a separate generator of variable fluid pressure. A branch conduit extends from the outlet port to a cylinder of a piston controlling the counteracting pressure, this conduit including a throttle resulting in a gradual or sudden increase of that pressure and, with it, of the load pressure as the piston moves progressively or instantaneously into an alternate position.

INVENTORS:
Hansjörg Dach
Konrad Sterk
Winfried Felder

ATTORNEY:

Karl F. Ross

INVENTORS:
Hansjörg Dach
Konrad Sterk
Winfried Felder

ATTORNEY:

Karl F. Ross

INVENTORS:
Hansjörg Dach
Konrad Sterk
Winfried Felder
ATTORNEY:

Karl F. Ross

INVENTORS:
Hansjörg Dach
Konrad Sterk
Winfried Felder

INVENTORS:
Hansjörg Dach
Konrad Sterk
Winfried Felder

ATTORNEY:

Karl F. Ross

VALVE CONSTRUCTION FOR CONTROLLED PRESSURE BUILDUP IN FLUID-OPERATED BRAKE OR CLUTCH

My present invention relates to a valve to be used in controlling the buildup of fluid pressure in a load responsive to such pressure, more particularly a hydraulic clutch or brake serving to apply torque from a driving shaft to a driven shaft or to arrest an element of a planetary-gear transmission. Hydraulically operated friction clutches and brakes of this type are conveniently used automotive construction to effect the automatic shifting of gears in response to a combination of controlling parameters such as accelerator position, engine speed and vehicular velocity.

The necessity for engaging and disengaging such hydraulically operated devices under load makes it desirable to provide for a gradual transition from the disengaged to the engaged stage or vice versa. Thus, it is important to limit the initial contact pressure (and therefore the initial ratio of torque transfer) to a fraction of its ultimate magnitude determined by the available supply pressure, this fraction being preferably independent of any variations in the supply structure which, in an automatic system, frequently varies with tee engine speed since it is generated by an engine-driven pump.

The general object of my present invention is to provide an improved valve construction satisfying the aforestated desiderata.

A more particular object is to provide means in such valve construction for establishing a predetermined response period within which, upon the application of fluid pressure to actuate the load, the operating pressure rises from its predetermined starting level to a final value substantially corresponding to the available supply pressure.

A further object, allied with the preceding one, is to provide means in such valve construction for letting the operating pressure rise at first gradually and then virtually instantaneously within the aforementioned response period.

It is also an object of my invention to provide a valve of this type in which the switchover from low-level to high-level operating pressure is controllable in accordance with an independent parameter of the system, such as the speed of the crankshaft or the engine shaft of the vehicle served by the hydraulically operated friction brake or clutch.

The foregoing objects are realized, in accordance with my present invention, by the provision of a valve housing with an inlet port connectable to a supply of operating fluid under high pressure an outlet port connected to a load and discharge port terminating at a region of relatively low pressure, such as a sump or the suction side of a pump working into the inlet port; a valve body, preferably comprising two axially spaced heads, has a starting provision in which it interconnects the inlet and outlet ports to the exclusion of the discharge port, the valve body also having a land which faces the inlet port so that this body is displaceable by the supply pressure from its starting position into a regulating position wherein the inlet port and/or the discharge port are partially blocked to establish a balance between and operating pressure lower than the supply pressure and restoring force opposing the displacement of the valve body; the restoring force is provided by biasing means including a spring and/or a source of counteracting fluid pressure, e.g. a pressure varying with shaft speed as discussed above.

According to an important feature of my invention, a branch conduit extends from the inlet port, directly or by way of the outlet port, to the biasing means to exert thereon a delayed controlling action which gradually increases the biasing force within the aforedescribed response period following the connection of the inlet port to its fluid supply so as to raise the operating pressure to a commensurate level.

According to a more specific feature of my invention, the valve body is a slider coaxially disposed in a housing which forms a cylinder for a piston constituting part of the biasing means. With interposition of a compression spring between the slider and the piston and with a constriction present in the branch conduit leading to a remote face of the piston which is larger than the land of the slider exposed to the operating pressure, the piston is subjected to a progressively increasing force approaching and ultimately exceeding the force tending to displace the slider; the piston now advances towards the slider to compress the spring and to increase its restoring force to a maximum value which it attains as the piston reaches an off-normal limiting position proximal to the slider. In that off-normal position, according to another feature of my invention, the piston bears directly upon the slider through an extension on one or the other of these two elements for shifting the slider toward its starting position so that the full supply pressure now acts upon the load as the operating pressure of the valve. In this latter instance, the final biasing force is derived directly from the operating pressure.

According to another feature of my invention, the spring pressure acting upon the piston of the slider may be supplemented or replaced by variable fluid pressure from the aforementioned generator responsive to input or output speed. As the piston reaches its alternate position, this biasing fluid pressure is again superseded by direct piston pressure to increase the level of the operating pressure.

According to a further feature of my invention, the system last described may be so designed that, under certain circumstances, the variable biasing pressure exceeds the loading force of the piston so that the latter is displaced toward its normal position, thereby reducing the restoring force acting upon the slide valve and causing a rapid decrease in the operating pressure effective at the load. Such an arrangement is particularly useful in a cutout clutch designed to separate a drive shaft from a driven shaft in the event of an excessive reaction torque.

The above and other features of my invention will become more apparent from the following detailed description of certain embodiments, reference being made to the accompanying drawing in which.

Figure 1:
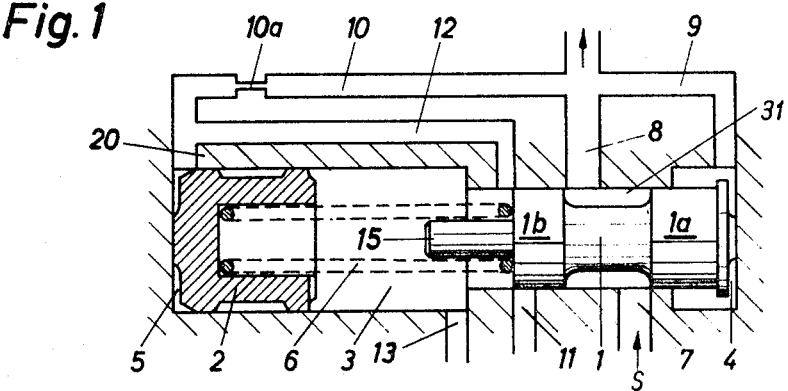
FIG. 1 is a longitudinal sectional view of a hydraulic valve according to my invention.
Figure 2:
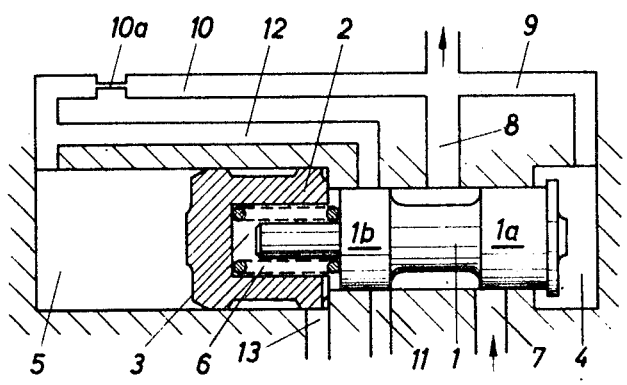
FIG. 2 is a view similar to FIG. 1, showing an alternate position of the valve.

In FIGS. 1 and 2 I have shown a valve comprising a housing 20 with two coaxial cylinder bores, i.e. a relatively small bore 31 for a valve body 1 and a relatively large cylinder bore 3 for a piston 2. Valve body 1 is a slider with two axially spaced heads 1a and 1b; head 1a extends into a larger fluid space 4 communicating with bore 31 through a channel 9 branching off an outlet port 8 which leads to a load not further illustrated, e.g. a friction clutch such as the one shown at K in FIGS. 6—8. An inlet port 7 communicates with bore 31 and is connectable, by conventional valves not shown, with a source of high-pressure fluid represented by an arrow S. Port 7 can also be vented to a sump or to the low-pressure side of the supply source, e.g. an oil pump driven by the engine of an automotive vehicle whose transmission system includes the friction clutch or brake served by the outlet port 8. A branch conduit 10, provided with a constriction 10a, leads from port 8 to a space 5 adjacent the remote face of piston 2, this face being larger than the lands of heads 1a and 1b which are subjected to fluid pressure from inlet port 7 and outlet port 8. Two discharge ports 11 and 13 connect bores 31 and 3, respectively, with the sump or low-pressure side of the hydraulic system. The space 5 also communicates in the starting position of FIG. 1, via a conduit 12, with the discharge port 13.

A compression spring 6 is interposed between slider 1 and piston 2, being received in a recess of the piston and partly coiled about a boss 15 projecting axially from the slider. This spring tends to maintain both elements 1 and 2 in the starting position of FIG. 1 in which the fluid supply S communicates with the load via ports 7 and 8.

Figure 5:
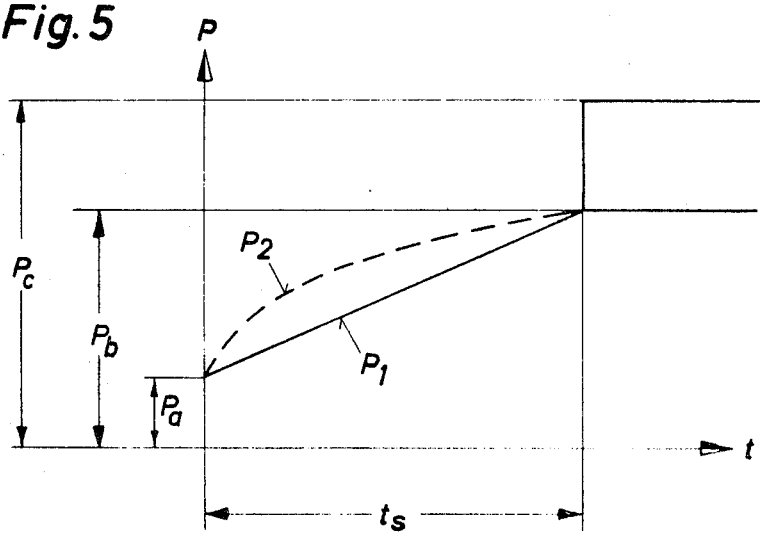
FIG. 5 is a graph representing the rise in operating pressure during a response period.

When pressure fluid is first admitted to port 7, slider 1 is urged toward the left so that its head 1a partly obstructs the inlet port 7, thereby throttling the operating pressure developed in bore 31 so as to limit it to a magnitude equaling the opposing force of biasing spring 6; this initial pressure level has been indicated at $P_a$ in FIG. 5. To help establish the pressure level $P_a$, head 1b may also partly unblock the discharge port 11. As the slider moves out of its starting position, the fluid pressure in space 4 acts fully upon the right-hand face of head 1a to accelerate the displacement of the slider. Gradually, after the initial leftward shift of slider 1 has cut off the conduit 12 to disconnect the space 5 from low-pressure port 13, the fluid pressure also builds up in this space 5 until it reaches a value sufficient to shift the piston 2 toward the right, such shifting exposing the full piston face to the fluid to accelerate its motion. The resulting increase in the initial spring force tends to repress the slider 1 toward the right into a new balancing position in which more fluid can reach the port 8 from the port 7 until, again, pressure equilibrium is established. Thus, the operating pressure in space 31 and, therefore, in outlet port 8 gradually approaches a level $P_b$ (FIG. 5) which it reaches after an interval $t_s$ representing the response period of the valve. This rise in load pressure $p$ is substantially linear, as illustrated at $p_1$ in FIG. 5. Thus, when piston 2 arrives in its alternate, off-normal limiting position shown in FIG. 2, the biasing force of spring 6 has reached a magnitude which may be only slightly below the supply pressure $P_c$ (FIG. 5).

Figure 3:
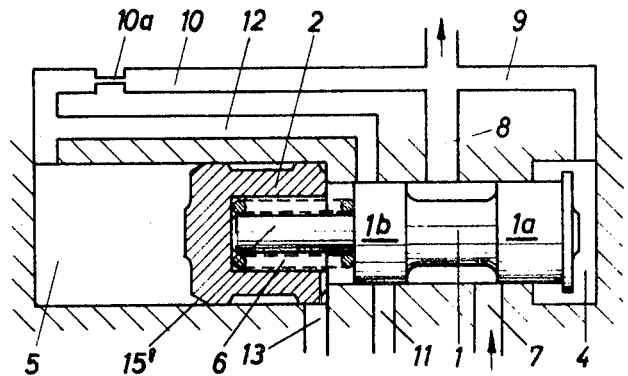
FIG. 3 is another view similar to FIG. 1, illustrating a third valve position and a modified construction of the valve body.

In order to achieve a final jump in pressure from level $P_b$ to the maximum $P_c$, I may extend the boss of slider 1 as illustrated at 15' in FIG. 3 whereby the piston 2, in its off-normal position, returns the slider toward its starting position (FIG. 1) to a sufficient extent for a substantially complete unblocking of inlet port 7, this final pressure rise being indicated by a vertical step in FIG. 5.

Figure 4:
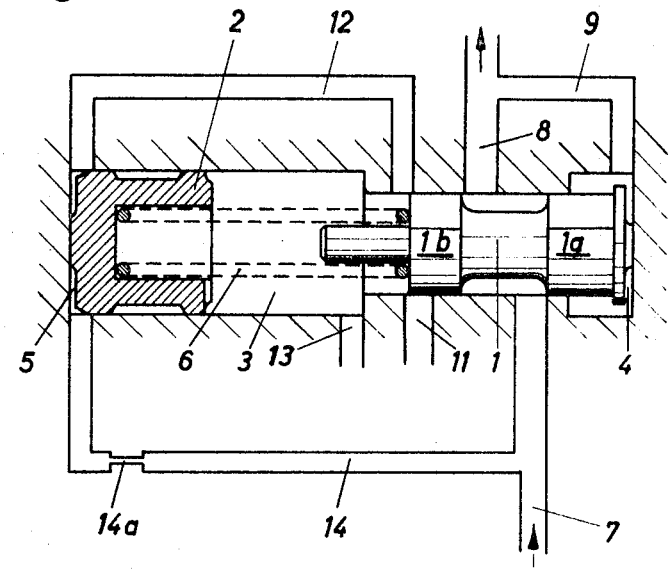
FIG. 4 is a further view similar to FIG. 1, illustrating another modification.

FIG. 4 shows the possibility of connecting the space 5 beyond piston 2 to the high-pressure side of the system through a direct passage 14 from inlet port 7, this passage including a construction or throttle 14a so that the fluid force acting upon the piston 2 is independent of the position of the valve body 1. In this case the pressure rise in outlet port 8 is no longer linear but can be represented by the upwardly convex curve $P_2$ (dotted lines) of FIG. 5. When the inlet port 7 is vented to release the brake or clutch, the pressure drop in outlet port 8 rapidly restores the slider 1 to its starting position and unblocks the low-pressure conduit 12 so that piston 2 is also quickly returned to the left-hand terminal of its stroke.

Figure 6:
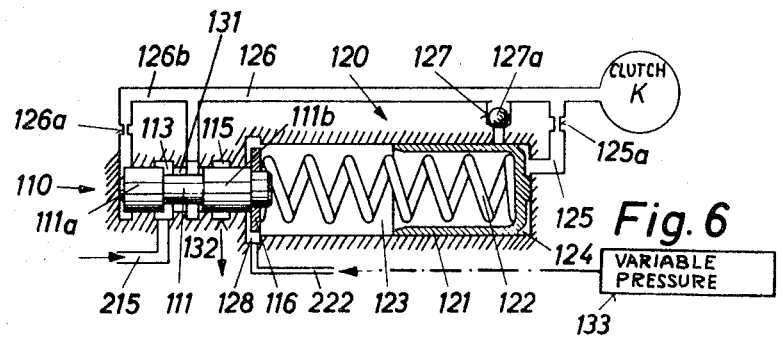
FIG. 6 is a further view similar to FIG. 1, illustrating still another embodiment.
Figure 7:
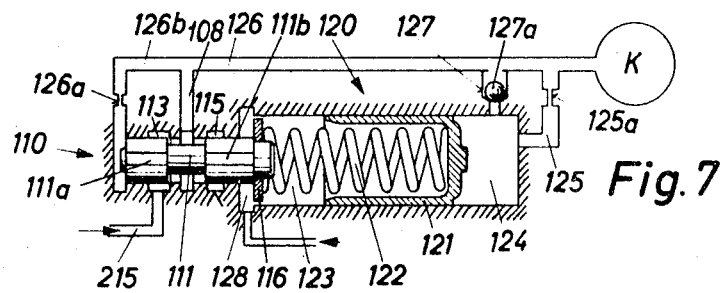
FIGS. 7 and 8 are views similar to FIG. 6, showing alternate valve positions.
Figure 8:
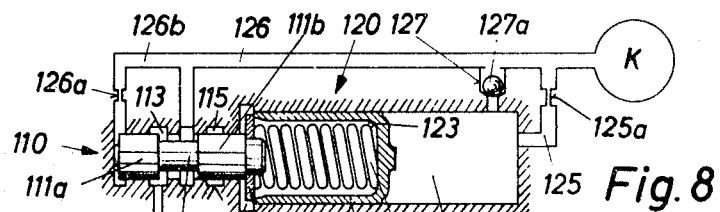

The system of FIGS. 6—8 is generally similar to that of FIGS. 1 and 2 and comprises a valve 110 with a housing 120 containing a slider 111 in a bore 131 and a piston 121 in a cylinder 123 coaxial therewith. Slider 111 has two heads 111a, 111b cooperating, in the aforedescribed manner, with an inlet port 215 terminating at an annular channel 113, a discharge port 132 opening into a similar ring channel 115 and an outlet port 108 leading to a conduit 126 which supplies pressure fluid to a load here shown as a friction clutch K. Between piston 121 and valve head 111b there is interposed a compression spring 122 bearing upon a disc 116 on a slider 111. The fluid space 124 on the far side of piston 121 is connected with conduit 126 through a branch 125 including a constriction 125a. Another branch 127, extending between channel 126 and a location further to the left, includes a check valve 127a designed to allow for the escape of fluid from cylinder 123 into the channel 126 upon a venting of the latter. A further branch 126b extends from outlet port 108 to the far side of valve head 111a and has a constriction 126a. A ring channel 128 of cylinder 123, proximal to slider 111, communicates with a duct 222 for the admission of hydraulic fluid under variable pressure from a generator 133, e.g. a pump driven by the engine shaft or the crankshaft of the vehicle; thus the pressure of the fluid normally admitted into cylinder 123 may be proportional to the speed of this shaft.

Figure 9:
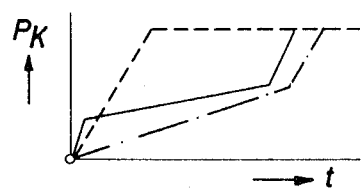
FIG. 9 is a graph generally similar to FIG. 5.

From the starting position of FIG. 6, the slider 111 is displaced, upon the admission of pressure fluid into port 215, toward the right to throttle the influx of fluid and to compress the spring 122 so as to establish an equilibrium as previously described. The pressure buildup in space 124 begins here immediately since there is no venting connection to be blocked by the displacement of the valve body. As shown in FIG. 9, the load pressure $P_K$ acting upon clutch K rises sharply (solid line) until it reaches a value corresponding to level $p_a$ of FIG. 5, filling the clutch with oil. Thereafter, the pressure rise is again gradual and is accompanied by a progressive shift of piston 121 toward the left through the intermediate position of FIG. 7 into the off-normal position of FIG. 8. In the latter position the piston 121 bears directly upon slider 111 through disc 116 and causes a steep rise in load pressure $P_K$. Dotted and dot-dash lines in FIG. 9 illustrate other pressure characteristics obtained with lower initial spring bias and different throttling rates at constriction 125a. Ball check 127a ensures a rapid venting of space 124, with restoration of the position of FIG. 6, upon a connection of inlet port 215 to the low-pressure side of the system.

Figure 8A:
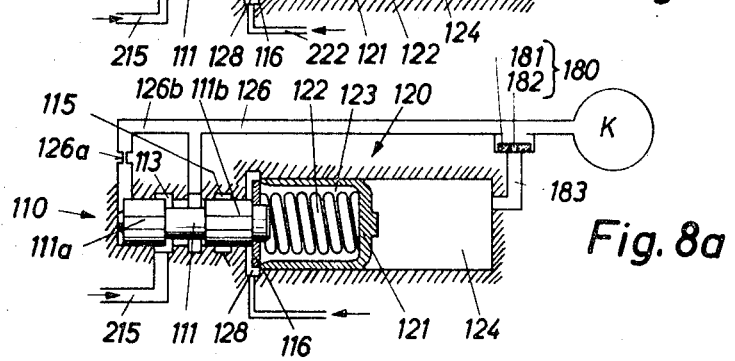
FIG. 8a is a view similar to FIG. 8, illustrating yet another modification.
Figure 10A:
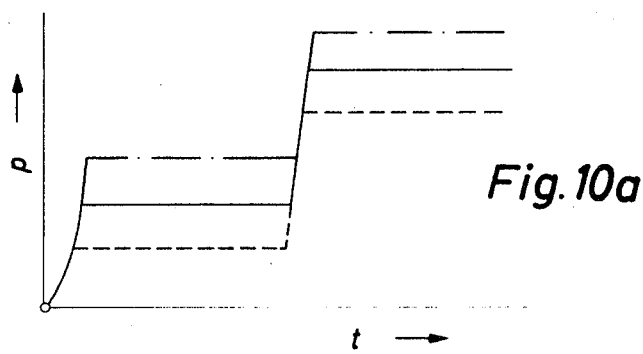
FIGS. 10a, 10b, 11a, 11b are sets of graphs similar to FIG. 9, relating to various operating conditions.
Figure 10B:
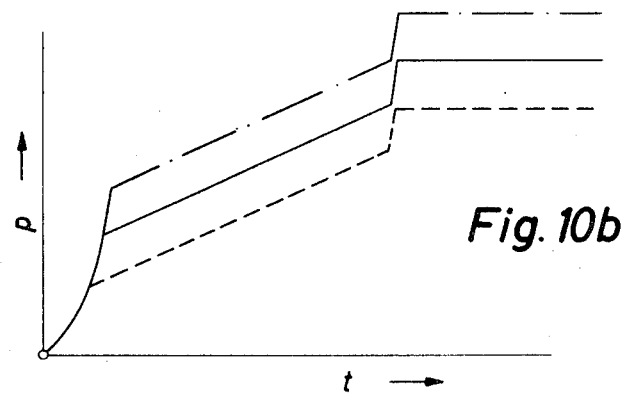

As shown in FIG. 8a, the check valve 127a and the throttle 125a of FIGS. 6—8 may be combined in a disc-shaped valve member 181 with an orifice 182 constituting the equivalent of the ball check of the preceding embodiment, the orifice controlling the admission of fluid into a single channel 183 replacing channels 125 and 127. If the spring 122 in FIGS. 6—8 or 8a is omitted, the biasing force is supplied only by the fluid from generator 133; the corresponding load pressures $p$ for varying throttling rates and ratios of effective areas of piston 121 and slider 111 are shown in FIG. 10a for supply pressures which vary with engine speed, and in FIG. 11a for constant supply pressure. FIGS. 10b and 11b represent the characteristics under like operating conditions but with interposition of spring 122.

In the usual automotive systems, the pressure delivered by the source 133 will never be greater than the system pressure appearing at port 215 during the operating period. Thus, once the position of FIG. 8 or 8a is reached, fluid pressure in line 222 will not be able to dislodge the slider 111 as long as pressure is maintained at input 215.

Unit K, heretofore assumed to be a switching clutch of a planetary gear system, may also be a normally inoperative driving clutch which closes, from standstill or after being magnetically opened during manual gear shifting, as soon as the engine shaft reaches a predetermined rotary speed, thus in response to a sufficient buildup of the pressure delivered to input 215 from an engine-driven pump; the countervailing pressure in line 222 may then be derived from the vehicular crankshaft, the latter being so coupled with the generator 133 that the output thereof decreases with rising crankshaft speed.

Figure 11A:
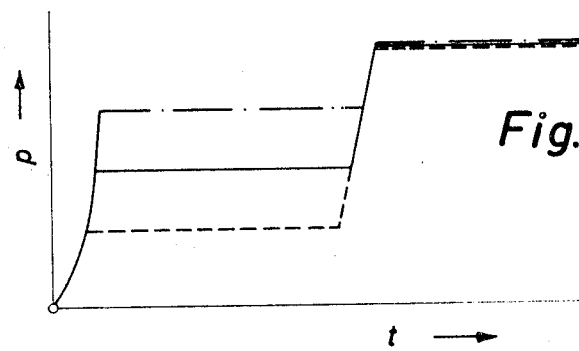
Figure 11B:
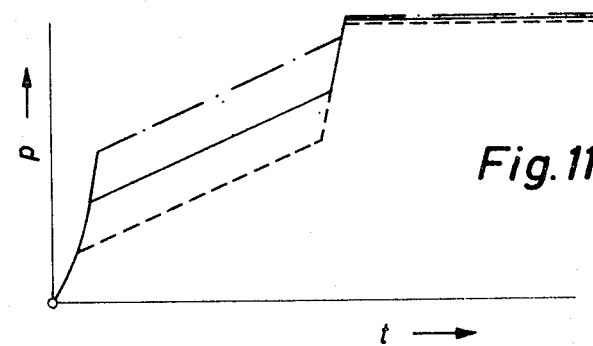

The modifications represented by the graphs of FIG. 9 (spring 122 without initial bias) and FIGS. 10a, 11a (spring omitted) are but of limited interest and will be useful only in special cases in which the reduced stability exhibited by these systems can be tolerated.

We claim:

1. In a fluid-pressure-operated system for controlling a load, in combination:

valve means comprising a housing with an inlet port connectable to a supply of high-pressure operating fluid, an outlet connected to the load and a discharge port terminating at a region of low pressure, said valve means having a starting position interconnecting said inlet port with said outlet to the exclusion of said discharge port, said valve means being provided with a land facing said inlet port for displacement by the supply pressure from said starting position into a regulation position wherein said valve means partly obstructs at least one of said ports for establishing in said outlet an operating pressure lower than said supply pressure;

biasing means opposing such displacement of said valve means by said supply pressure for establishing said operating pressure at a level corresponding to the biasing force, said housing forming a cylinder open toward said valve means, said biasing means including a piston in said cylinder and resilient force-transmitting means linking said piston with said valve means;

throttled conduit means extending from said inlet port to a fluid space in said cylinder for progressively building up a pressure differential across said piston to shift same from a normal position in a direction increasing said biasing force within a predetermined response period following connection of said inlet port to said supply, thereby sharply augmenting said operating pressure;

and pressure-control means terminating at said cylinder for preventing the buildup of said pressure differential until said supply pressure has reached a substantial magnitude.

2. The combination defined in claim 1 wherein said pressure-control means comprises a venting channel leading from said fluid space to said region of low pressure, said venting channel being blockable by said valve means upon incipient displacement of the latter from said starting position.

3. The combination defined in claim 2 wherein said piston has an off-normal position isolating said venting channel from said region of low pressure independently of said valve means.

4. The combination defined in claim 1 wherein said conduit means is connected with said inlet port by way of said outlet.

5. The combination defined in claim 1 wherein said valve means comprises a slider coaxial with said piston, said force-transmitting including a compression spring interposed between said piston and said slider.

6. The combination defined in claim 5 wherein said cylinder is provided with an additional port communicating with a zone of reduced pressure, said piston separating said additional port from said conduit means.

7. The combination defined in claim 6 wherein said pressure control means includes a source of variable fluid pressure communicating with said additional port for opposing a shaft of said piston from its normal position.

8. The combination defined in claim 6 wherein said cylinder is provided with unidirectionally effective venting means for rapidly discharging pressure fluid therefrom into said conduit means upon disconnection of said inlet port from said supply.

9. The combination defined in claim 8 wherein said venting means comprises a check valve.

10. The combination defined in claim 9 wherein said check valve is provided with an orifice forming part of, said throttled conduit means.

11. The combination defined in claim 5 wherein said piston and said slider are provided with cooperating formations interengageable in an off-normal limiting position of said piston for shifting said slider toward said starting position to an extent sufficient to apply substantially the full supply pressure to said outlet.

12. The combination defined in claim 5 wherein said slider is provided with two spaced-apart heads on opposite sides of said inlet port, one of said heads being proximal to said piston, said housing forming a bore for said slider with an equalizing connection from said outlet to a location confronting the other of said heads.